(12) United States Patent
Hart et al.

(10) Patent No.: US 9,514,658 B1
(45) Date of Patent: Dec. 6, 2016

(54) SYNTHETIC SKIN AND TISSUE MODEL

(71) Applicants: Stuart Richard Hart, Tampa, FL (US); Mario Alves Simoes, Pinellas Park, FL (US)

(72) Inventors: Stuart Richard Hart, Tampa, FL (US); Mario Alves Simoes, Pinellas Park, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 14/814,714

(22) Filed: Jul. 31, 2015

Related U.S. Application Data

(60) Provisional application No. 62/031,595, filed on Jul. 31, 2014.

(51) Int. Cl.
| | |
|---|---|
| *G09B 23/30* | (2006.01) |
| *B29C 70/02* | (2006.01) |
| *B29K 21/00* | (2006.01) |
| *B29L 31/00* | (2006.01) |

(52) U.S. Cl.
CPC .............. *G09B 23/30* (2013.01); *B29C 70/021* (2013.01); *B29K 2021/00* (2013.01); *B29L 2031/7532* (2013.01)

(58) Field of Classification Search
USPC ................................................ 434/276, 267
See application file for complete search history.

(56) References Cited

U.S. PATENT DOCUMENTS

| | | | | |
|---|---|---|---|---|
| 5,199,130 A | * | 4/1993 | Lazar ...................... | A47L 13/20 15/147.1 |
| 7,272,766 B2 | * | 9/2007 | Sakezles ................ | G09B 23/30 434/262 |
| 7,322,826 B2 | | 1/2008 | Zeeff | |
| 2004/0067591 A1 | * | 4/2004 | Madsen ................. | A61B 5/055 436/8 |
| 2010/0167254 A1 | * | 7/2010 | Nguyen ................. | G09B 23/30 434/272 |

(Continued)

OTHER PUBLICATIONS

Fahrig, R. et al. A three-dimensional cerebrovascular flow phantom, Medical Physics. Aug. 1999, 26 (8): 1589-1599.

(Continued)

*Primary Examiner* — James Hull
(74) *Attorney, Agent, or Firm* — Michele L. Lawson; Robert J. Varkonyi; Smith & Hopen, P.A.

(57) ABSTRACT

A synthetic tissue model using one or more semi-flexible polymers or resin with at least one embedded mesh material is provided herein. The model provides suitable simulation of animal tissue designed to mimic tissue stiffness through varying the polymerization to simulate tissue stiffness level. Multiple polymers or multiple layers of polymer possessing different polymerization levels can be used to simulate tissues with different layers, such as skin. A mesh incorporated in the model provides durability, and can simulate layers of tissue through selection of the mesh material. A skin model using silicone-like material with a nylon tulle mesh was used to simulate skin for surgical procedures. The nylon tulle mesh increased resistance to tearing over time, due to insertion of surgical tools, thereby increasing usable life of the model and enhancing training as the model simulated skin for longer periods of time.

10 Claims, 3 Drawing Sheets

(56) References Cited

U.S. PATENT DOCUMENTS

2014/0162232 A1* 6/2014 Yang .................. G09B 23/285
  434/267

OTHER PUBLICATIONS

Kerber, Charles W. et al. Flow Dynamics in the Human Carotid Artery: I. Preliminary Observations Using a Transparent Elastic Model. American Journal of Neuroradiology, Jan./Feb. 1992, 13:173-180.

Ecoflex Series Super-Soft, Addition Cure Silicone Rubbers. Product Overview. Smooth-on, Inc. www.smooth-on.com.

3-Dmed. Learning Through Simulation. https:\\www.3-dmed.com/product/soft-tissue-suture-pad. Accessed on Oct. 1, 2015.

SimuLab. Improve Your Suturing Skills. Student Suturing Packages. http:\\simulab.com/tools-improve-suturing-skills. Accessed on Oct. 1, 2015.

SimVivo. Sim*Suture. http\\sim-vivo.com/simsuture.html. Accessed on Oct. 1, 2015.

SynDaver Labs. Synthetic Human Tissues & Body Parts. http\\syndavercom/shop/syndaver/anatomy-model/. Accessed on Oct. 1, 2015.

SurgiReal. Better Education. Better Outcomes. Catalog. http\\surgireal.com/collections/all/products/0150 and http:\\surgireal.com/collection/all/products0100. Accessed on Oct. 1, 2015.

SynDaver Labs. Synthetic Human Tissues & Body Parts. http:\\syndavercom/shop/syntissue/adult-skin/. Access on Oct. 1, 2015.

\* cited by examiner

SYNTHETIC SKIN AND TISSUE MODEL

CROSS REFERENCE TO RELATED APPLICATION

This application claims priority to U.S. Provisional Patent Application No. 62/031,595, entitled "Synthetic Skin and Tissue Model", filed on Jul. 31, 2014, the contents of which are herein incorporated by reference

FIELD OF INVENTION

This invention relates to animal tissue models. More specifically, the present invention provides a synthetic model for simulating various animal tissues.

BACKGROUND OF THE INVENTION

The need for anatomic models for medicinal science has been present since the advent of medicine, when Herophilus first used cadavers to train individuals. Currently, fresh, frozen, and fixed animal and/or human cadaveric tissues are used to educate and train individuals in anatomy and the medicinal sciences. However, these tissues may be anatomically different or possess differing mechanical properties to a living human patient.

Human skin is often categorized into thick skin, with a thickness of 400-600 μm, and thin skin, with a thickness of 75-150 μm. It is formed by a dermal layer, i.e. the dermis, formed of a highly vascularized network of collagen, elastin, fibronectin, and fibroblasts, an epidermal layer, of keratinocytes, melanocytes, Langerhans cells, Merkel cells, and a dermal-epidermal junction (basement membrane) between the epidermis and dermis. The skin can possess a stiffness of 185 N/m to 300 N/m, depending on area of the skin, hydration levels, age.

Anatomical reproductions and models are replacing cadavers for medical training. The need to practice surgical techniques has become increasingly important in the rapidly changing medical field. Artificial models provide advantages relative to cost, storage, reliability and shelf life. Furthermore, newer models account for differences in soft and hard tissue, allowing medical personnel to practice techniques using enhanced fidelity, and permits medical personnel to examine medical procedures and products, and how those procedures and products interact with a patient.

However, the majority of models will, at most, simulate the hard and soft tissue. However, some tissues, such as skin, possess varying characteristics throughout the various layers of the tissue. This limits the usefulness of such models, as the manipulation (i.e., scoring, cutting, moving, clamping, etc.) performed on the model fails to realistically simulate living tissue. Further, many models are not durable, and must be replaced at a high frequency. For example, Zeeff (U.S. Pat. No. 7,322,826) developed a soft tissue model formed of a nylon core material and a polyurethane cladding, which has limited elasticity due to the nylon core. The core and cladding are optionally attached as a bone or modeled bone, or configured to simulate a tendon. The model can be dyed for enhanced realism Additionally, current models used for practicing surgical techniques, also known as suture pads, are typically made from silicone or silicone and foam rubber. Suturing the material can be challenging as the silicone and foam tears easily upon pulling the sutures tight and through multiple uses. Examples of current suture pads include Smooth-on suture pads, such as various silicone products sold under the EcoFlex mark like EcoFlex 00-30 and EcoFlex Gel, silicon, silicon and latex, or silicone and foam models offered by 3-Dmed, as well as models from Simulab, Simvivo, Syndaver, Surgireal. Such high model turnover drastically increases the costs of training, as well as causing inferior training as the model ages through use.

As such, what is needed is a model that can realistically simulate the weight and consistency of soft tissues, while providing a durable product to limit the high turnover associated with most current models.

SUMMARY OF THE INVENTION

An animal tissue model is provided, which is formed from a synthetic skin formed from at least one polymer material designed to simulate animal tissue and at least one layer of mesh disposed within the at least one polymer material. The model is made from a silicone or rubber material, or material that is similar to silicone or rubber, such as silicone, rubber, silicone-like material, an elastomeric material, or rubber-like material. Some examples include polyacrylate rubber, ethylene-acrylate rubber, polyester urethane, bromo-isobutylene isoprene, polybutadiene, chloro-isobutylene isoprene, chlorosulphonated polyethylene, polychloroprene, epichlorohydrin, ethylene propylene, ethylene propylene diene monomer, polyether urethane, perfluorocarbon rubber, fluoro-silicone, fluorocarbon rubber, hydrogenated nitrile butadiene, polyisoprene, acrylonitrile butadiene, polyurethane, styrene butadiene, styrene ethylene butylene styrene copolymer, polysiloxane, vinyl methyl silicone, acrylonitrile butadiene carboxy monomer, styrene butadiene carboxy monomer, thermoplastic polyether-ester, styrene butadiene block copolymer, styrene butadiene carboxy block copolymer. In some instances the material is layered to simulate fascia. Inclusion of specific mesh material can further simulate the fascia. In specific embodiments, the material is printed using a 3-dimensional printer.

Optionally, arteries and veins were modeled from actual human arteries by injecting fresh cadaver arteries with acrylic resin. Alternatively, arteries and veins were constructed in wax using resin cast human model duplicating dimensions and shape of actual cerebral human veins. When the vein and artery models were placed in the model mold and synthetic skin added, i.e. one or more elastomeric polymer(s), the wax was removed thermically and/or chemically (Fahrig et al., A Three-Dimensional Cerebrovascular Flow Phantom, Medical Physics, 1999, 26 (8): 1589-1599; Kerber, et al., B-Flow Dynamics in the Human Carotid Artery: I. Preliminary Observations Using a Transparent Elastic Model, American Journal of Neuroradiology, 1992, 13:173-180) thereby simulating arteries and veins. In further alternative variations, simulated veins are constructed by dipping a glass or brass rod in liquid soft plastic. The rods are repetitively dipped in molten plastic, which forms a thin layer about the rod. Successively dipping the rods thicken the plastic layer. The soft plastic is allowed to cure around the rod, with one end of the rod sealed in soft plastic. Once cooled the rods are removed leaving tubular cavities, which are cut to appropriate length. The ends of the tubes are then sealed by application of a plastic patch dipped in molten plastic.

The polymer material is optionally two different polymer materials, three different polymer materials, or multiple layers of polymer material having differing polymerization levels. The polymer is optionally bonded using a resin or liquid silicone binder.

The at least one layer of mesh is optionally polyamide (nylon), polyvinylchloride, polyvinylidenechloride, polytetrafluoroethylene, metal, or plastic. Nonlimiting examples of metal mesh include titanium, stainless steel, or surgical steel. Nonlimiting examples of plastics include acrylonitrile butadiene styrene (ABS), high impact polystyrene (HIPS), acrylic (PMMA), cellulose acetate, cyclic olefin copolymer (COC), ethylene-vinyl acetate (EVA), ethylene vinyl alcohol (EVOH), polyvinylfluoride (PVF), polyvinylidene fluoride (PVDF), polytetrafluoroethylene (PTFE), polychlorotrifluoroethylene (PCTFE), fluorinated ethylene-propylene (FEP), perfluoroalkoxy polymer (PFA), polyethylenechlorotrifluoroethylene (ECTFE), polyethylenetetrafluoroethylene (ETFE), perfluoropolyether (PCPE), acrylic/PVC polymer, aromatic polyester polymers (liquid crystal polymer), polyoxymethylene (acetal), polyamide (PA, nylon), polyamide-imide (PAI), polyaryletherketone (PAEK), polybutadiene (PBD), polybutylene (PB), polybutylene terephthalate (PBT), polycaprolactone (PCL), polychlorotrifluoroethylene (PCTFE), polyethylene terephthalate (PET), polycyclohexylene dimethylene terephthalate (PCT), polycarbonate (PC), polyhydroxyalkanoate (PHA), polyketone (PK), polyester, polyethylene (PE), polyetheretherketone (PEEK), polyetherimide (PEI), polyethersulfone (PES), chlorinated polyethylene (CPE), polyimide (PI), polylactic acid (PLA), polymethylpentene (PMP), polyphenylene oxide (PPO), polyphenylene sulfide (PPS), polyphthalamide (PPA), polypropylene (PP), polystyrene (PS), polysulfone (PSU), polytrimethylene terephthalate (PTT), polyurethane (PU), polyvinyl acetate (PVA), polyvinyl chloride (PVC), polyvinylidene chloride (PVDC), styrene-acrylonitrile (SAN). Preferably the plastic is polyamide (nylon) tulle netting mesh. In specific embodiments the mesh layer is disposed 1-2 mm below the upper surface of the at least one polymer material. Nonlimiting examples include 1 mm, 1.1 mm, mm, 1.2 mm, 1.3 mm, 1.4 mm, 1.5 mm, 1.6 mm, 1.7 mm, 1.8 mm, 1.9 mm, 2.0 mm. Examples of nylon include the ϵ-caprolactam PA6, the polymer of hexamethylenediamine and adipic acid PA66, a combination of PA6 and PA66, and a combination of hexamethylenediamine and sebacic acid (P6/PA610).

In some variations, the model is designed to simulate skin. Some skin sections have a stiffness of about 185 N/m to about 320 N/m, or 185 N/m to 320 N/m. For example, skin stiffness can be in the range of about 185 N/m to about 210 N/m, about 210 N/m to about 255 N/m, about 280 N/m to about 320 N/m, 185 N/m to 210 N/m, 210 N/m to 255 N/m, 280 N/m to 320 N/m or at 185 N/m, 190 N/m, 200 N/m, 210 N/m, 220 N/m, 230 N/m, 240 N/m, 250 N/m, 255 N/m, 260 N/m, 270 N/m, 280 N/m, 285 N/m, 290 N/m, 300 N/m, 310 N/m, 320 N/m. The synthetic skin has a thickness of about 75 µm to about 600 µm, or 75 µm to 600 µm. Nonlimiting examples of thicknesses are 75 µm, 80 µm, 85 µm, 90 µm, 95 µm, 100 µm, 110 µm, 120 µm, 130 µm, 140 µm, 150 µm, 160 µm, 170 µm, 180 µm, 190 µm, 200 µm, 210 µm, 220 µm, 230 µm, 240 µm, 250 µm, 260 µm, 270 µm, 280 µm, 290 µm, 300 µm, 310 µm, 320 µm, 330 µm, 340 µm, 350 µm, 360 µm, 370 µm, 380 µm, 390 µm, 400 µm, 410 µm, 420 µm, 430 µm, 440 µm, 450 µm, 460 µm, 470 µm, 480 µm, 490 µm, 500 µm, 510 µm, 520 µm, 530 µm, 540 µm, 550 µm, 560 µm, 570 µm, 580 µm, 590 µm, 600 µm.

In specific variations of the invention, the model is used to simulate a vaginal cuff. In such embodiments, the model optionally includes integrated ligaments for adhesion onto the base providing physicians a challenging model. A custom mold was used to form the model out of silicone or rubber. The ligaments are optionally formed from strands of nylon. A reusable base holds the vaginal cuff. The integrated mesh in the model allows suturing of the features without ripping out of the sutured area.

A method of manufacturing the animal tissue model is also disclosed. At least one layer of mesh is placed into a mold. At least one polymer material is mixed with a cross-linking agent or polymerization and added to the mold. The at least one polymer material is then permitted to polymerize in the mold, thereby embedding the at least one layer of mesh within the at least one polymer material.

The at least one polymer material is a silicone or rubber material, or material that is similar to silicone or rubber, such as silicone, rubber, silicone-like material, an elastomeric material, or rubber-like material. Some examples include polyacrylate rubber, ethylene-acrylate rubber, polyester urethane, bromo-isobutylene isoprene, polybutadiene, chloro-isobutylene isoprene, chlorosulphonated polyethylene, polychloroprene, epichlorohydrin, ethylene propylene, ethylene propylene diene monomer, polyether urethane, perfluorocarbon rubber, fluoro-silicone, fluorocarbon rubber, hydrogenated nitrile butadiene, polyisoprene, acrylonitrile butadiene, polyurethane, styrene butadiene, styrene ethylene butylene styrene copolymer, polysiloxane, vinyl methyl silicone, acrylonitrile butadiene carboxy monomer, styrene butadiene carboxy monomer, thermoplastic polyether-ester, styrene butadiene block copolymer, styrene butadiene carboxy block copolymer.

The mesh material can be plastic. Some examples include plastics such as polyamide, polyvinylchloride, polyvinylidenechloride, polytetrafluoroethylene, metal, or plastic. Nonlimiting examples of metal mesh include titanium, stainless steel, or surgical steel. Nonlimiting examples of plastics include acrylonitrile butadiene styrene, high impact polystyrene, acrylic, cellulose acetate, cyclic olefin copolymer, ethylene-vinyl acetate, ethylene vinyl alcohol, polyvinylfluoride, polyvinylidene fluoride, polytetrafluoroethylene, polychlorotrifluoroethylene, fluorinated ethylene-propylene, perfluoroalkoxy polymer, polyethylenechlorotrifluoroethylene, polyethylenetetrafluoroethylene, perfluoropolyether, acrylic/PVC polymer, polyoxymethylene, polyamide-imide, polyaryletherketone, polybutadiene, polybutylene, polybutylene terephthalate, polycaprolactone, polychlorotrifluoroethylene, polyethylene terephthalate, polycyclohexylene dimethylene terephthalate, polycarbonate, polyhydroxyalkanoate, polyketone, polyester, polyethylene, polyetheretherketone, polyetherimide, polyethersulfone, chlorinated polyethylene, polyimide, polylactic acid, polymethylpentene, polyphenylene oxide, polyphenylene sulfide, polyphthalamide, polypropylene, polystyrene, polysulfone, polytrimethylene terephthalate, polyurethane, polyvinyl acetate, polyvinyl chloride, polyvinylidene chloride, styrene-acrylonitrile, or a combination thereof. Preferably the mesh is polyamide (nylon) tulle netting mesh.

In some embodiments, the at least one polymer material is layered to simulate fascia. For example, multiple polymer materials are provided, such as a second polymer material, and polymerized in a mold. The first and second polymer material are aligned with the at least one layer of mesh and a resin or liquid silicone binder applied to the multiple polymer materials

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

As used herein, the singular forms "a," "an" and "the" include plural referents unless the context clearly dictates otherwise. Thus, for example, reference to "a polypeptide" includes a mixture of two or more polypeptides and the like.

As used herein, "about" means approximately or nearly and in the context of a numerical value or range set forth means±15% of the numerical.

As used herein "animal" means a multicellular, eukaryotic organism classified in the kingdom Animalia or Metazoa. The term includes, but is not limited to, mammals. Non-limiting examples include rodents, aquatic mammals, domestic animals such as dogs and cats, farm animals such as sheep, pigs, cows and horses, and humans. Wherein the terms "animal" or "mammal" or their plurals are used, it is contemplated that it also applies to any animals.

As used herein the term "patient" is understood to include an animal, especially a mammal, and more especially a human that is receiving or intended to receive treatment.

As used herein, "substantially" means largely if not wholly that which is specified but so close that the difference is insignificant, and such differences do not influence the functional properties of the term beyond the normal tolerances permitted by one of skill in the art. In some embodiments, "substantially" means that the differences do not vary by more than 10% or less.

Figure 1:
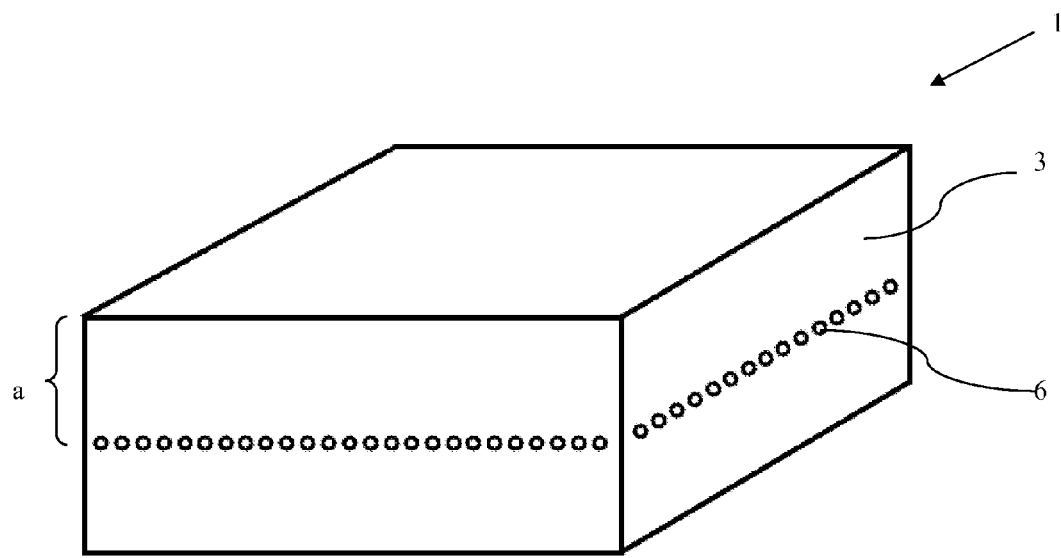
FIG. 1 is an illustration of a first embodiment of the invention made of mesh embedded about 2 mm below the surface of a polymer synthetic skin.

As used herein, "upper" and "lower" or "bottom" are referenced based on the image depicted in FIG. 1. "Upper" is in a direction toward the top of FIG. 1, and "lower" or "bottom" is directed toward the bottom of FIG. 1.

Example 1

Skin model 1 is composed of synthetic skin 2 and embedded mesh 6, as seen in FIG. 1. Nylon tulle netting mesh was placed into a mold and silicone rubber (Smooth-On, Inc.) poured into the mold to for synthetic skin 2. Optionally, the silicone rubber is added in sequential layers to create multi-layered slab of various thicknesses of silicone. Embedded mesh 6 is set distance a from the exterior surface of synthetic skin 2, such as 1-2 mm from the exterior surface. The resulting model of skin has the representation of fascia at both the outer and inner surfaces of the slab due to the mesh layers located 1-2 mm below both surfaces. This novel suture pad combines several layers that mimic closely what one would find in real skin. The layers are reinforced to tolerate tension and pulling while suturing and practicing other procedures.

Example 2

Figure 2:
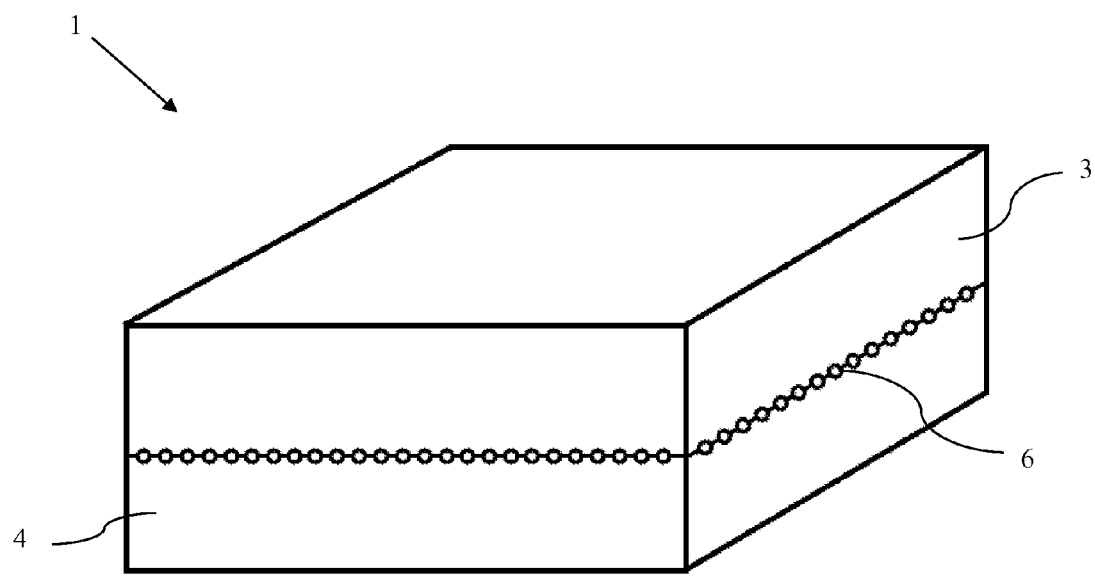
FIG. 2 is an illustration of a second embodiment of the invention made of mesh embedded between two layers of polymer synthetic skin.

Skin model 1 is composed of synthetic skin 2, formed of multiple layers designated as synthetic epidermis 3, synthetic dermis 4, and embedded mesh 6, as seen in FIG. 2. Synthetic epidermis 3 and synthetic dermis 4 are silicone rubber or foam having different stiffness. It is known that thick skin has a thickness of 400-600 μm, whereas thin skin has a thickness of 75-150 μm, and skin has a stiffness that varies from 185 N/m to 300 N/m, depending on area of the skin, hydration levels, age. The difference in stiffness between synthetic epidermis 3 and synthetic dermis 4 may be formed by altering the degree of polymerization of silicone, thereby causing a difference in the elastomeric properties of the silicone, or by using a combination of different elastomeric materials. Synthetic epidermis 3 and synthetic dermis 4 are layered with mesh, thereby simulating organ walls, muscle, and other tissues with appropriate fascia, thickness, and consistency. A resin, or liquid silicone, is added to synthetic epidermis 3 and synthetic dermis 4 to bond the layers.

Example 3

Figure 3:
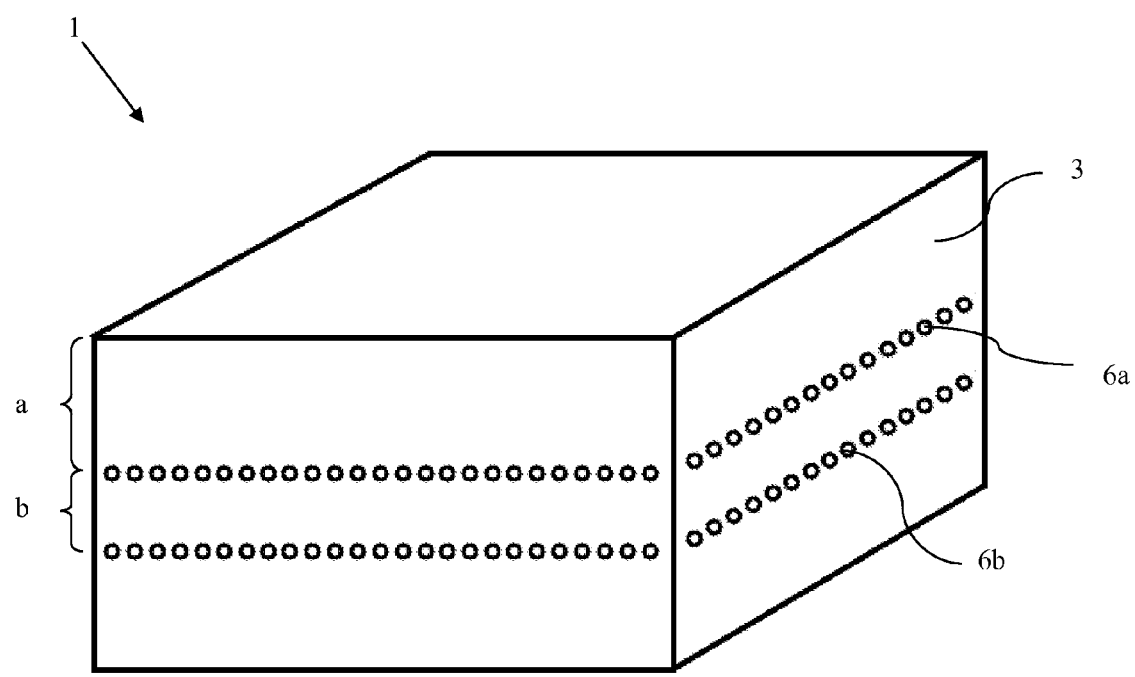
FIG. 3 is an illustration of a third embodiment of the invention made of a first mesh embedded about 2 mm below the surface of a polymer synthetic skin and a second mesh embedded below the first mesh.

Skin model 1 is composed of synthetic skin 2 and two or more layers of embedded mesh 6, as seen in FIG. 3. Silicone rubber or foam is poured into a mold to a distance a. Preferably, distance a is approximately 1-2 mm. A first layer of embedded mesh 6a was placed on the silicone rubber or foam and allowed to partially set. Silicone rubber or foam having the same properties as the originally poured silicone rubber or foam was added to a distance b and a second layer of embedded mesh 6b was placed on the silicone rubber or foam. The silicone rubber or foam was allowed to partially set again, and a final layer of silicone rubber or foam added to encapsulate second layer of embedded mesh 6b in synthetic skin 2.

Example 4

Figure 4:
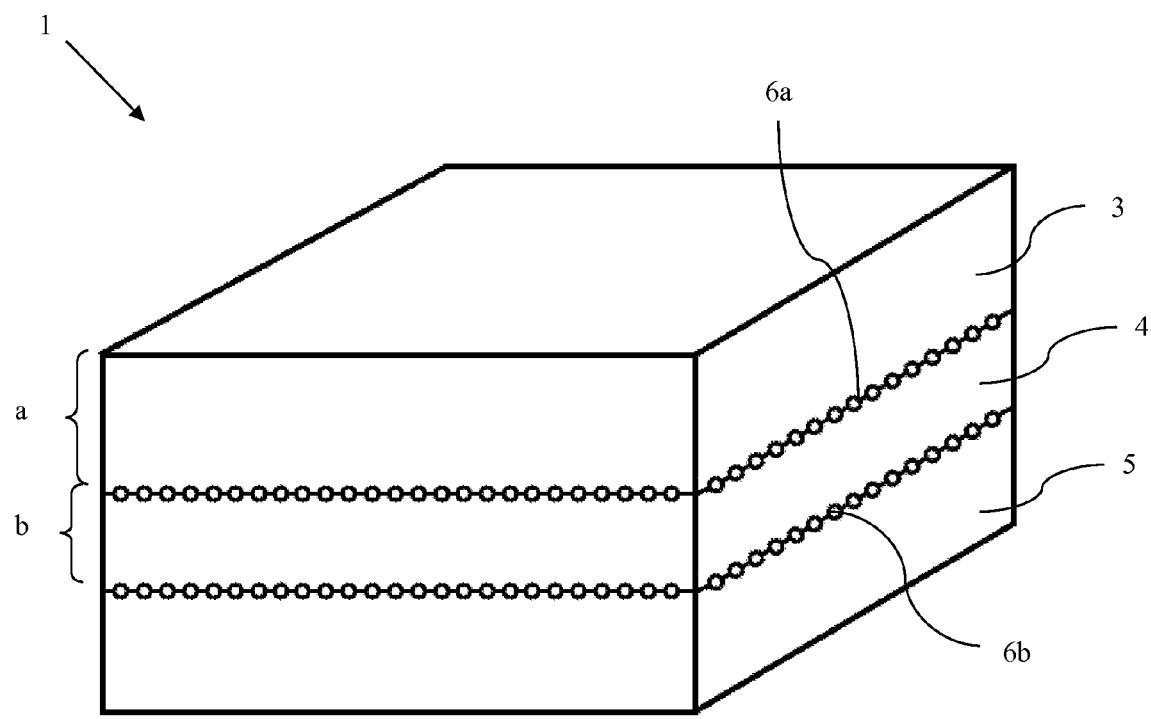
FIG. 4 is an illustration of a fourth embodiment of the invention made of a first mesh embedded between a first layer of polymer synthetic skin and second layer of polymer synthetic skin, and a second mesh embedded between the second layer of polymer synthetic skin and a third layer of polymer synthetic skin.

Skin model 1 is composed of synthetic skin 2, formed of multiple layers designated as synthetic epidermis 3, synthetic dermis 4, synthetic adipose layer 5, and two or more layers of embedded mesh 6, as seen in FIG. 4. Silicone rubber or foam is poured into a mold to a distance a. Preferably, distance a is approximately 1-2 mm. A first layer of embedded mesh 6a was placed on the silicone rubber or foam and allowed to fully or partially set. Synthetic dermis 4 is formed by pouring a layer of polymer material onto embedded mesh 6a to a distance b. Synthetic dermis 4 has a different stiffness from synthetic epidermis 3, which can be accomplished using different polymers or altering the degree of polymerization of the polymer, such as silicone, thereby causing a difference in the elastomeric properties, as described in Example 2. Alternatively, synthetic dermis 4 is formed by pouring a layer of elastomeric polymer material into a mold and adding a resin, or liquid silicone, to synthetic epidermis 3 and synthetic dermis 4 to bond the layers.

A second layer of embedded mesh 6b was placed on synthetic dermis 4. Synthetic adipose layer 5 was then added. Synthetic adipose layer 5 may be poured onto second layer of embedded mesh 6b and allowed to set. Alternatively, synthetic adipose layer 5 is poured in a mold and bonded to synthetic dermis 4 as described previously. This allows the synthetic tissue layers and mesh to simulating organ walls, muscle, and other tissues with appropriate fascia, thickness, and consistency.

Example 5

A vaginal cuff model was created with integrated ligaments for adhesion onto a base and to provide physicians a challenging model. The model was created using a mold, designed to simulate the vagina cuff. Silicone or silicone rubber was poured into the mold as described in Examples 1-4. The embedded mesh was applied as described above. However, the strands of the mesh extended beyond the edges of the silicone or silicone rubber. The strands were collected and adhered together using a resin or other adhesive to form simulated ligaments. The ligaments were attached to a reusable base.

The various layers optionally are differing stiffnesses to simulate various layers of epidermis and dermis. An optional third layer is included to simulate adipose.

In the preceding specification, all documents, acts, or information disclosed does not constitute an admission that the document, act, or information of any combination thereof was publicly available, known to the public, part of the general knowledge in the art, or was known to be relevant to solve any problem at the time of priority.

The disclosures of all publications cited above are expressly incorporated herein by reference, each in its entirety, to the same extent as if each were incorporated by reference individually.

While there has been described and illustrated specific embodiments of a suture model and method of manufacture, it will be apparent to those skilled in the art that variations and modifications are possible without deviating from the broad spirit and principle of the present invention. It is also to be understood that the following claims are intended to cover all of the generic and specific features of the invention herein described, and all statements of the scope of the invention which, as a matter of language, might be said to fall therebetween.

What is claimed is:

1. An animal tissue model, comprising:
   a synthetic skin formed from at least two layers of at least one polymer material designed to simulate animal tissue, wherein the polymer material is silicone, rubber, silicone-like material, an elastomeric material, or rubber-like material;
   a resin or liquid silicone binder positioned between the layers of silicone skin; and
   at least one layer of mesh, wherein the at least one layer of mesh is disposed within the at least one polymer material at a distance of between 1-2 mm below surface of the polymer material;
   wherein strands of the at least one layer of mesh extend beyond the synthetic skin;
   a resin adhering the strands of the mesh to each other to form simulated ligaments;
   wherein the synthetic skin has a stiffness of 185 N/m to 300 N/m.

2. The animal tissue model of claim 1, wherein the at least one polymer material is polyacrylate rubber, ethylene-acrylate rubber, polyester urethane, bromo-isobutylene isoprene, polybutadiene, chloro-isobutylene isoprene, chlorosulphonated polyethylene, polychloroprene, epichlorohydrin, ethylene propylene, ethylene propylene diene monomer, polyether urethane, perfluorocarbon rubber, fluoro-silicone, fluorocarbon rubber, hydrogenated nitrile butadiene, polyisoprene, acrylonitrile butadiene, polyurethane, styrene butadiene, styrene ethylene butylene styrene copolymer, polysiloxane, vinyl methyl silicone, acrylonitrile butadiene carboxy monomer, styrene butadiene carboxy monomer, thermoplastic polyether-ester, styrene butadiene block copolymer, or styrene butadiene carboxy block copolymer.

3. The animal tissue model of claim 1, wherein the at least one layer of mesh is polyamide, polyvinylchloride, polyvinylidenechloride, polytetrafluoroethylene, metal, or plastic.

4. The animal tissue model of claim 3, wherein the metal is titanium, stainless steel, or surgical steel.

5. The animal tissue model of claim 3, wherein the plastic is acrylonitrile butadiene styrene, high impact polystyrene, acrylic, cellulose acetate, cyclic olefin copolymer, ethylene-vinyl acetate, ethylene vinyl alcohol, polyvinylfluoride, polyvinylidene fluoride, polytetrafluoroethylene, polychlorotrifluoroethylene, fluorinated ethylene-propylene, perfluoroalkoxy polymer, polyethylenechlorotrifluoroethylene, polyethylenetetrafluoroethylene, perfluoropolyether, acrylic/PVC polymer, polyoxymethylene, polyamide-imide, polyaryletherketone, polybutadiene, polybutylene, polybutylene terephthalate, polycaprolactone, polychlorotrifluoroethylene, polyethylene terephthalate, polycyclohexylene dimethylene terephthalate, polycarbonate, polyhydroxyalkanoate, polyketone, polyester, polyethylene, polyetheretherketone, polyetherimide, polyethersulfone, chlorinated polyethylene, polyimide, polylactic acid, polymethylpentene, polyphenylene oxide, polyphenylene sulfide, polyphthalamide, polypropylene, polystyrene, polysulfone, polytrimethylene terephthalate, polyurethane, polyvinyl acetate, polyvinyl chloride, polyvinylidene chloride, styrene-acrylonitrile, or a combination thereof.

6. The animal tissue model of claim 5, wherein the plastic is polyamide tulle netting mesh.

7. The animal tissue model of claim 1, further comprising a plurality of polymer materials or a polymer material having differing polymerization levels.

8. The animal tissue model of claim 7, wherein the plurality of polymer materials is two different polymer materials or three different polymer materials.

9. The animal tissue model of claim 1, wherein the synthetic skin further comprises a synthetic epidermis layer and a synthetic dermis layer, wherein the synthetic dermis layer is positioned below the synthetic epidermis layer and where the synthetic dermis layer has a different stiffness than the synthetic epidermis layer.

10. The animal tissue model of claim 9, further comprising resin or liquid silicone between the synthetic epidermis layer and the synthetic dermis layer to bond the synthetic epidermis layer and the synthetic dermis layer together.

* * * * *